(12) United States Patent
Ozeki et al.

(10) Patent No.: US 8,649,168 B2
(45) Date of Patent: Feb. 11, 2014

(54) CASE FOR A DISK STORAGE APPARATUS

(75) Inventors: Tsuyoshi Ozeki, Aichi (JP); Kentaro Saito, Aichi (JP)

(73) Assignee: Buffalo Inc., Nagoya-shi (JP)

( * ) Notice: Subject to any disclaimer, the term of this patent is extended or adjusted under 35 U.S.C. 154(b) by 208 days.

(21) Appl. No.: 13/356,961

(22) Filed: Jan. 24, 2012

(65) Prior Publication Data

US 2012/0188705 A1 Jul. 26, 2012

(30) Foreign Application Priority Data

Jan. 25, 2011 (JP) ................................. 2011-012807

(51) Int. Cl.
*G06F 1/16* (2006.01)
(52) U.S. Cl.
USPC ..................... 361/679.35; 248/633
(58) Field of Classification Search
USPC ........... 361/679.35, 679.34, 679.36; 188/371; 248/633
See application file for complete search history.

(56) References Cited

U.S. PATENT DOCUMENTS

| | | | | | |
|---|---|---|---|---|---|
| 2,919,046 | A | * | 12/1959 | Parsons ........................ | 206/521 |
| 3,185,428 | A | * | 5/1965 | Farabaugh, Jr. et al. ...... | 248/569 |
| 4,705,257 | A | * | 11/1987 | Leo et al. ...................... | 248/611 |
| 4,749,164 | A | * | 6/1988 | Leo et al. ...................... | 248/674 |
| 4,893,210 | A | * | 1/1990 | Mintzlaff ...................... | 360/137 |
| 6,498,719 | B1 | * | 12/2002 | Bridges ..................... | 361/679.34 |
| 6,567,265 | B1 | * | 5/2003 | Yamamura et al. ...... | 361/679.34 |
| 6,809,916 | B2 | * | 10/2004 | Nakata et al. ................. | 361/115 |
| 6,831,830 | B2 | * | 12/2004 | Bruner et al. ............ | 361/679.33 |
| 7,079,380 | B2 | * | 7/2006 | Wubs ....................... | 361/679.35 |
| 7,196,902 | B2 | * | 3/2007 | Albrecht et al. ......... | 361/679.33 |
| 7,471,509 | B1 | * | 12/2008 | Oliver ....................... | 361/679.33 |
| 7,486,509 | B2 | * | 2/2009 | Kim et al. ................. | 361/679.34 |
| 7,593,221 | B2 | * | 9/2009 | Sheng ....................... | 361/679.35 |
| 7,889,492 | B2 | * | 2/2011 | Chen et al. ................ | 361/679.36 |
| 2002/0043608 | A1 | * | 4/2002 | Nakata et al. ................. | 248/560 |
| 2002/0079244 | A1 | * | 6/2002 | Kwong ......................... | 206/305 |
| 2005/0039995 | A1 | * | 2/2005 | Inoke et al. .................... | 188/371 |
| 2006/0061954 | A1 | * | 3/2006 | Lam ............................ | 361/685 |
| 2007/0030639 | A1 | * | 2/2007 | Ko ................................ | 361/685 |
| 2007/0039811 | A1 | | 2/2007 | Yanai et al. | |
| 2008/0291618 | A1 | * | 11/2008 | Sheng .......................... | 361/685 |
| 2009/0073649 | A1 | * | 3/2009 | Ikeda et al. ............... | 361/679.35 |

FOREIGN PATENT DOCUMENTS

| | | |
|---|---|---|
| JP | 61-88628 U | 6/1986 |
| JP | 2000-277935 | 10/2000 |
| JP | 2001-236136 | 8/2001 |
| JP | 2002-367361 | 12/2002 |
| JP | 3685469 | 6/2005 |
| JP | 2007-52962 A | 3/2007 |
| JP | 2007-179704 A | 7/2007 |
| WO | WO 03/103356 A1 | 12/2003 |

OTHER PUBLICATIONS

English Translation of the Japanese Office Action issued Dec. 11, 2012 in Patent Application No. 2011-012807.

\* cited by examiner

*Primary Examiner* — Lisa Lea Edmonds

(74) *Attorney, Agent, or Firm* — Oblon, Spivak, McClelland, Maier & Neustadt, L.L.P.

(57) ABSTRACT

A case arranged to contain a disk storage apparatus. The case includes a case wall including a case inner flat face that extends along a outer flat face of the disk storage apparatus when the disk storage apparatus is contained in the case, and a deformable plate disposed between the outer flat face and the case inner flat face and that extends along the case inner flat face when the disk storage apparatus is contained in the case.

18 Claims, 7 Drawing Sheets

CASE FOR A DISK STORAGE APPARATUS

CROSS-REFERENCE TO RELATED APPLICATIONS

The present application claims priority to Japanese Patent Application No. 2011-12807 filed on Jan. 25, 2011, the disclosure of which is hereby incorporated by reference in its entirety.

BACKGROUND

1. Technical Field

The present invention relates to a case. In particular, the present disclosure relates to a case for a disk storage apparatus.

2. Related Art

Hard disk storage apparatuses tend to easily undergo a problem, such as a malfunction or a failure, because of a shock. There have been proposed a variety of cases to contain hard disk storage apparatuses, which are fabricated in such designs as to achieve an improvement in shock resistance.

For example, a structure has already been proposed wherein plate springs are formed in the casing of metal sheet and shock absorbing material (e.g. polystyrene gel) is stuck to each plate spring. This structure can achieve an improvement in shock resistance as shocks will be absorbed through the deformation of both the plate spring and the shock absorber.

SUMMARY

In the conventional structure described above, the plate spring and the shock absorber are deformed in the direction perpendicular to the wall of the case to absorb a shock. The size of the case therefore tended to be large enough to ensure a sufficient degree of the deformation of the plate spring and the shock absorber. This is not only a problem concerning a technique for improving the shock resistance of cases for hard disk storage apparatuses, but also a problem concerning a technique for improving resistance of cases for disk storage apparatuses including rotatable disks, against external forces caused by shocks, vibrations, and so on.

A main advantage of the present disclosure is to provide a technique for enabling a case fabricated to contain a disk storage apparatus to achieve an improvement in resistance against an external force while limiting an increase in the size of the case.

The present disclosure has been conceived to solve the aforementioned problems at least in part, and may be put into practice in the modes described below.

According to an embodiment of the disclosure, there is provided a case arranged to contain a disk storage apparatus having a hexahedral shape including a outer flat face. The case includes a case wall and a deformable plate. The a case wall includes a case inner flat face that extends along the outer flat face of the disk storage apparatus when the disk storage apparatus is contained in the case. The deformable plate is disposed between the outer flat face and the case inner flat face and that extends along the case inner flat face when the disk storage apparatus is contained in the case. The deformable plate includes a first arched plate portion and a first flexible plate portion. The first arched plate portion has a arched shape in a cross-section as viewed in a direction parallel to the case inner flat face, the first arched plate portion including a first top portion, a first foot portion and a second foot portion, the first top portion disposed closer to a first flat face that is one of the outer flat face and the case inner flat face than a second flat face that is the other of the outer flat face and the case inner flat face, the first foot portion and the second foot portion disposed closer to the second flat face than the first flat face, the first arched plate portion configured to be deformed under a pressure applied perpendicularly to the first top portion. The first flexible plate portion is continuous with the first foot portion and extends from the first foot portion in a direction away from the first top portion, the first flexible plate portion configured to bend in response to deformation of the first arched plate portion.

DESCRIPTION OF EMBODIMENTS

Embodiments will be described below with reference to the accompanying drawings.

A. First Embodiment

Figure 1:
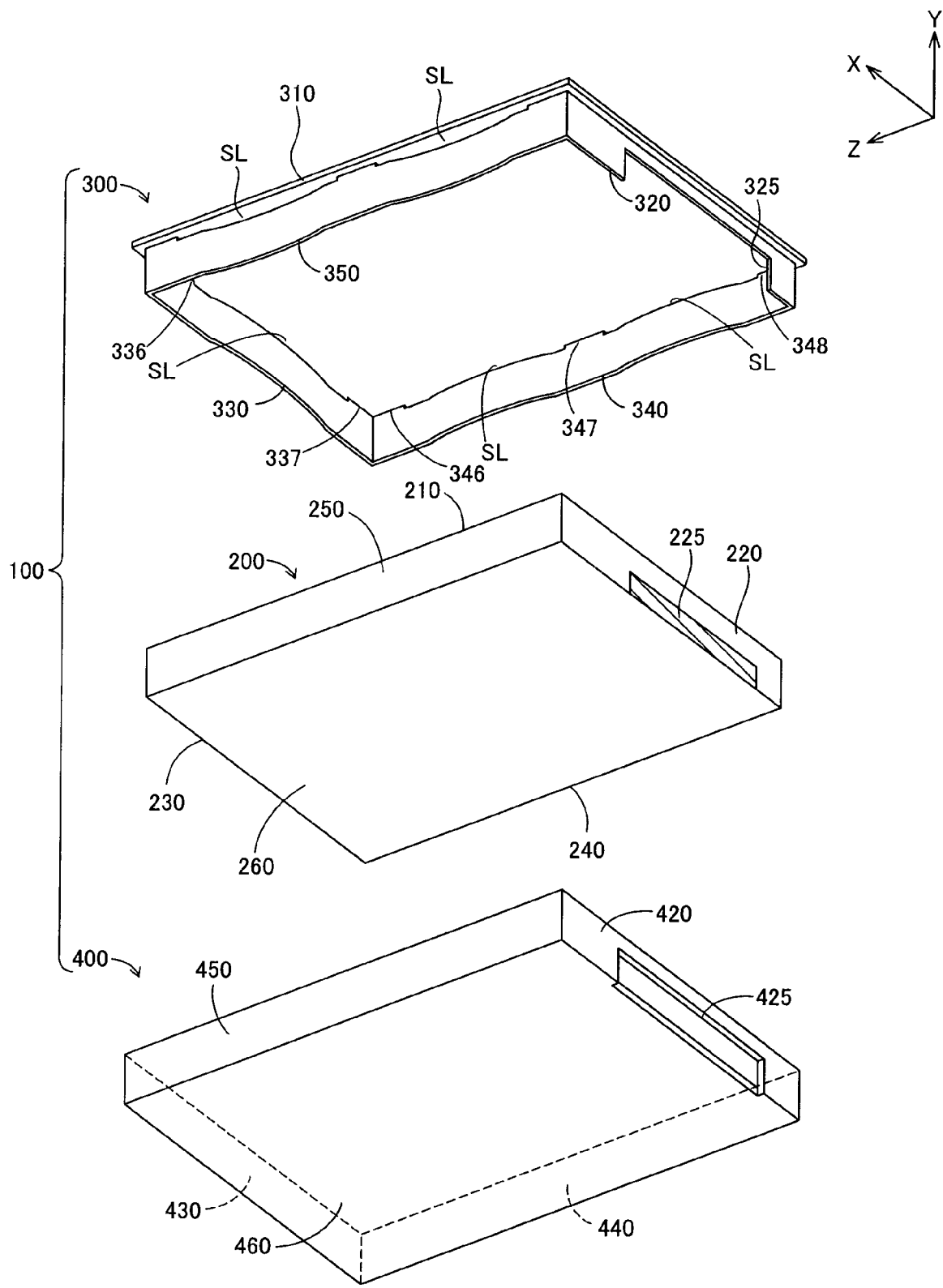
FIG. 1 is a schematic diagram illustrating the structure of a case according to a first embodiment.

FIG. 1 is a schematic diagram illustrating the structure of a case 100 according to a first embodiment. The case 100 includes a box member 400 and a cover member 300. Each of the box member 400 and the cover member 300 is made of acrylonitrile butadiene styrene (ABS) resin, which is a kind of thermoplastic resin, and is produced by an injection molding process. Note, however, that each of the box member 400 and the cover member 300 may be made of another type of thermoplastic resin, such as polycarbonate or polystyrene, for example. Also note that each of the box member 400 and the cover member 300 may be made of hard rubber.

The case 100 is so fabricated as to contain a 2.5-inch hard disk drive 200. The hard disk drive 200 has a housing in the shape of a rectangular parallelepiped. Note here that the "rectangular parallelepiped" housing mentioned above does not strictly refer to the geometrically exact shape of an orthogonal parallelepiped, but is similar to an orthogonal parallelepiped casing with its edges and vertices chamfered and with its surfaces raised and depressed here and there, which is the housing of the 2.5 inch or 3.5 inch hard disk drive currently on the market. The housing of the hard disk drive 200 includes six outer wall surfaces: a first wide surface 210 (i.e., surface perpendicular to the y-axis in FIG. 1), a first short side surface 230 (i.e., surface perpendicular to the z-axis in FIG. 1), a second short side surface 220 (i.e., surface perpendicular to the z-axis in FIG. 1), a first long side surface 240 (i.e., surface perpendicular to the x-axis in FIG. 1), a second long side surface 250 (i.e., surface perpendicular to the x-axis in FIG. 1), and a second wide surface 260 (i.e., surface perpendicular to the y-axis in FIG. 1). A connector 225 is fitted in the second short side surface 220 of the hard disk drive 200. The connector 225 complies with the serial advanced technology attachment (SATA) standard.

The cover member 300 includes a cover wall 310, a first shock absorbing plate 330, a second shock absorbing plate 340, a third shock absorbing plate 350, and an accessory plate 320. The cover wall 310 has an inner wall surface that extends along the first wide surface 210 of the hard disk drive 200 in the situation where the hard disk drive 200 is contained in the case 100 (hereinafter referred to as "contained situation").

Each of the three shock absorbing plates 330, 340, and 350 and the accessory plate 320 is arranged to be perpendicular to the cover wall 310. In the contained situation, the shock absorbing plates 330, 340, and 350 and the accessory plate 320 form a structure to surround the hard disk drive 200. Specifically, the first shock absorbing plate 330 extends along the first short side surface 230 of the hard disk drive 200 in the contained situation. The second shock absorbing plate 340 extends along the first long side surface 240 of the hard disk drive 200 in the contained situation. The third shock absorbing plate 350 extends along the second long side surface 250 of the hard disk drive 200 in the contained situation.

The accessory plate 320 has an opening 325 cut for a connector. The connector opening 325 serves to enable a wire outside of the case 100 to be connected to the connector 225 of the hard disk drive 200 in the contained situation. The shape of each of the three shock absorbing plates 330, 340, and 350 will be described in detail below.

The box member 400 includes a bottom wall 460, a first short side wall 430, a second short side wall 420, a first long side wall 440, and a second long side wall 450. The box member 400 has an opening that faces in the positive direction of the y-axis in FIG. 1. The bottom wall 460 has an inner wall surface that extends along the second wide surface 260 of the hard disk drive 200 in the contained situation. The first short side wall 430 has an inner wall surface that extends along the first short side surface 230 of the hard disk drive 200 in the contained situation. The second short side wall 420 has an inner wall surface that extends along the second short side surface 220 of the hard disk drive 200. The first long side wall 440 is has an inner wall surface that extends along the first long side surface 240 of the hard disk drive 200. The second long side wall 450 has an inner wall surface that extends along the second long side surface 250 of the hard disk drive 200. The second short side wall 420 has a connector opening 425 defined therein. The connector opening 425 is provided to enable the wire outside of the case 100 to be connected to the connector 225 of the hard disk drive 200 in the contained situation.

In the contained situation, the housing of the hard disk drive 200 is fitted inside the encircling structure formed by the three shock absorbing plates 330, 340, and 350 and the accessory plate 320 of the cover member 300. The encircling structure is designed to have dimensions slightly smaller than those of corresponding portions of the housing of the hard disk drive 200. Therefore, the housing of the hard disk drive 200 is fitted inside the encircling structure while the encircling structure is slightly bent outward. The encircling structure of the cover member 300 is fitted into the box member 400, resulting in the contained situation.

In the contained situation, the first shock absorbing plate 330 is situated between the first short side surface 230 of the hard disk drive 200 and the inner surface of the first short side wall 430. In addition, in the contained situation, the second shock absorbing plate 340 is situated between the first long side surface 240 of the hard disk drive 200 and the inner surface of the first long side wall 440. Moreover, in the contained situation, the third shock absorbing plate 350 is situated between the second long side surface 250 of the hard disk drive 200 and the inner surface of the second long side wall 450.

Figure 2A:
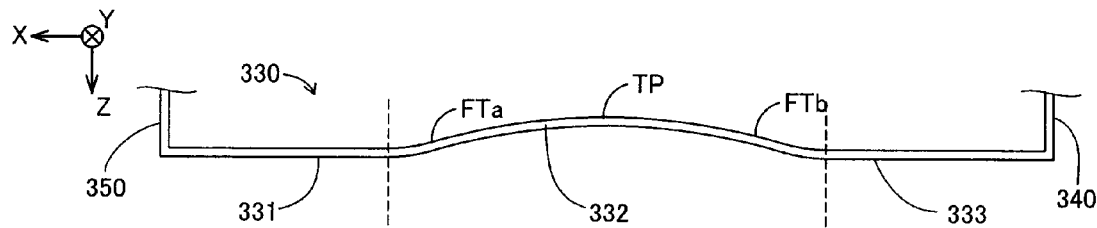
FIGS. 2A and 2B are diagrams for explaining the shape of a first shock absorbing plate 330 according to the first embodiment.
Figure 2B:
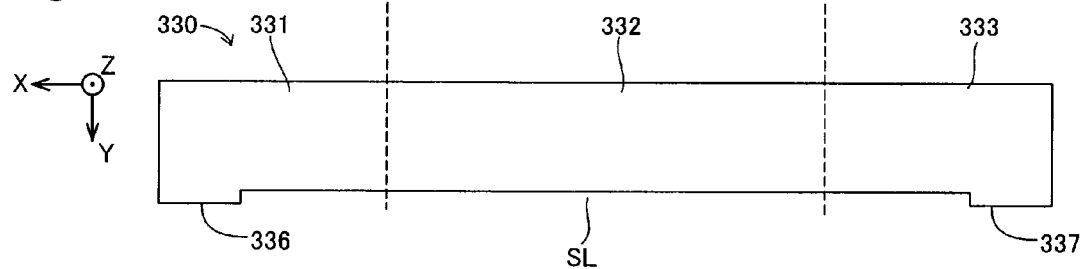
Figure 3A:
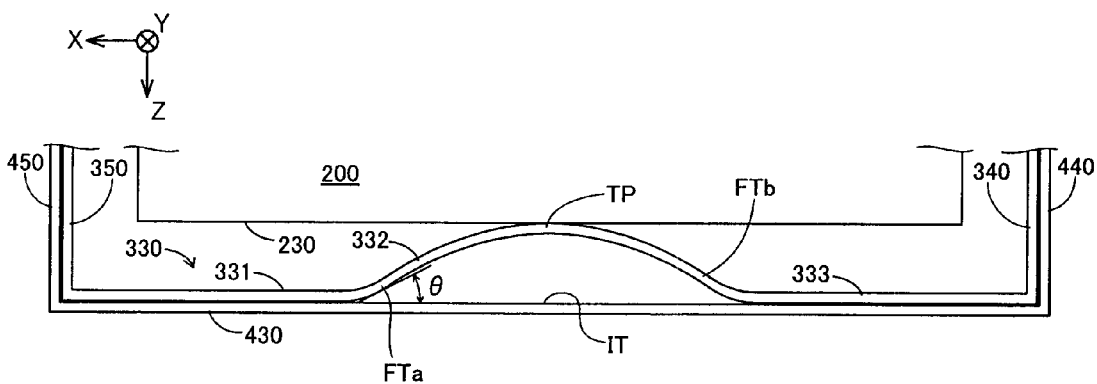
FIGS. 3A and 3B are diagrams for explaining a function of the first shock absorbing plate 330 according to the first embodiment.
Figure 3B:
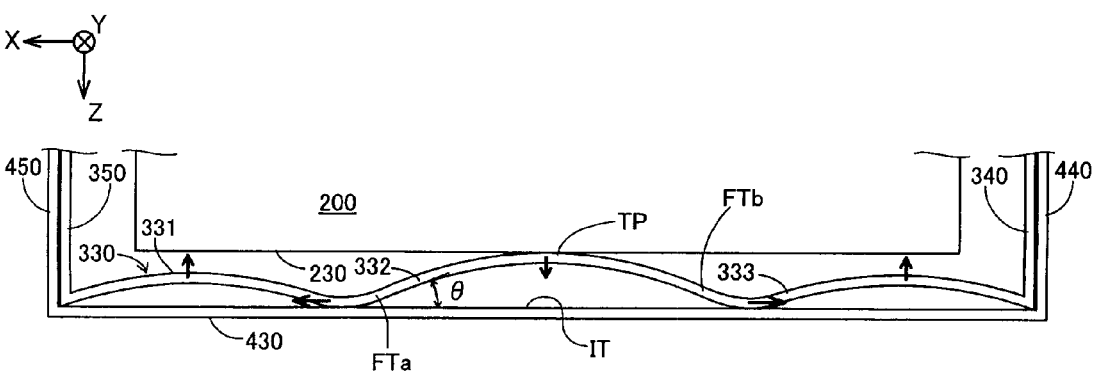

FIGS. 2A and 2B are diagrams for explaining the shape of the first shock absorbing plate 330 according to the first embodiment. FIG. 2A is a diagram illustrating the first shock absorbing plate 330 when viewed from the negative direction of the y-axis. In FIG. 1, the y-axis extends in the direction perpendicular to both the bottom wall 460 of the box member 400 and the second wide surface 260 of the hard disk drive 200 in the contained situation. FIG. 2B is a diagram illustrating the first shock absorbing plate 330 when viewed from the positive direction of the z-axis. The z-axis extends in the direction perpendicular to both the inner surface of the first short side wall 430 and the first short side surface 230 of the hard disk drive 200 in the contained situation. FIGS. 3A and 3B are diagrams for explaining the function of the first shock absorbing plate 330 according to the first embodiment. As in FIG. 2A, FIGS. 3A and 3B are diagrams illustrating the first shock absorbing plate 330 when viewed from the negative direction of the y-axis. In FIGS. 3A and 3B, for easier understanding, the dimension along the z-axis is enlarged relative to the dimension along the x-axis. In FIG. 3A, the first shock absorbing plate 330 is undergoing little deformation (i.e., is in the normal state), when the case 100 containing the hard disk drive 200 stands still. In FIG. 3B, the first shock absorbing plate 330 is undergoing elastic deformation (., is in the shock absorbing state) as when the case 100 containing the hard disk drive 200 receives a shock due to dropping impact.

As shown in FIG. 2B, the first shock absorbing plate 330 has a substantially rectangular shape when viewed in the direction of the z-axis. The first shock absorbing plate 330 has leg portions 336 and 337 at both longitudinal ends thereof. As shown in FIG. 1, the first shock absorbing plate 330 is joined to the cover wall 310 at the leg portions 336 and 337. A slit SL is defined between the remaining portion (i.e., longitudinal middle portion) of the first shock absorbing plate 330 and the cover wall 310. As described above, the first shock absorbing plate 330 is joined to the cover wall 310 at only the leg portions 336 and 337. This contributes to reducing the degree of inhibition of the deformation (which will be described in detail below) of the first shock absorbing plate 330 in the shock absorbing state by joints (if they are made) between the first shock absorbing plate 330 and the cover wall 310.

The first shock absorbing plate 330 includes an arched portion 332 and a flat portions 331 and 333. As shown in FIGS. 2A, 3A, and 3B, the arched portion 332 has the shape of a circular arc when viewed in the direction of the y-axis. The arched portion 332 includes a top portion TP and foot portions FTa and FTb. As shown in FIGS. 3A and 3B, in the contained situation, the top portion TP is in contact with the first short side surface 230 of the hard disk drive 200, while the foot portions FTa and FTb are closer to the inner wall surface (i.e., surface IT in FIGS. 3A and 3B) of the first short side wall 430 of the box member 400.

As shown in FIGS. 2A, 3A, and 3B, the flat portion 331 is a continuation to the foot portion FTa of the arched portion 332 and extends from the foot portion FTa in the direction away from the top portion TP of the arched portion 332 (i.e., in the positive direction of the x-axis in FIG. 2A). The flat portion 333 is a continuation to the foot portion FTb of the arched portion 332 and extends from the foot portion FTb in the direction away from the top portion TP of the arched portion 332 (i.e., in the negative direction of the x-axis in FIG. 2A).

The flat portion 331 and the foot portion FTa of the arched portion 332 are smoothly continuous with each other. Note here that the wording "(for two portions) to be smoothly continuous with each other" refers to the fact that the curvatures of the two portions change continuously where they meet each other. To be more concrete, when viewed in the direction of the y-axis, the angle of the tangent to the foot portion FTa of the arched portion 332 with respect to the x-axis gradually decreases toward the flat portion 331, and the angle becomes zero (i.e. the tangent becomes parallel to the x-axis) where the flat portion 331 and the arched portion 332 join each other.

Similarly, the flat portion 333 and the foot portion FTb of the arched portion 332 are smoothly continuous with each other.

In FIGS. 2A, 3A, and 3B, the arched portion 332 is elastically deformed as illustrated in FIG. 3B upon application of a force to the arched portion 332 at its top position in the direction parallel to the thickness of the first shock absorbing plate 330 (i.e., in the positive direction of the z-axis). A more specific description will be made below of the deformation of the arched portion 332 caused when a shock is absorbed. When a shock is absorbed, the top portion TP of the arched portion 332 is pressed by the first short side surface 230 of the hard disk drive 200, while at the same time the foot portions FTa and FTb of the arched portion 332 are pressed by the inner wall surface of the first short side wall 430. As a result, the arched portion 332 is compressed to elastically deform in the direction perpendicular to both the first short side surface 230 of the hard disk drive 200 and the inner wall surface of the first short side wall 430 of the box member 400 (i.e., in the direction parallel to the z-axis) as illustrated in FIG. 3B.

In FIG. 3B, when the arched portion 332 is deformed by the compressing force in the direction parallel to the z-axis, the arched portion 332 is elongated along the x-axis. Consequently, this compressing force causes the foot portions FTa and FTb to slide toward the fixed ends of the flat portions 331 and 332, respectively. This slides induce compressing forces in the flat portions 331 and 332 in the direction of x-axis. As a result, the flat portions 331 and 332 bend toward the first short side surface 230 of the hard disk drive 200 as illustrated in FIG. 3B.

Figure 4A:
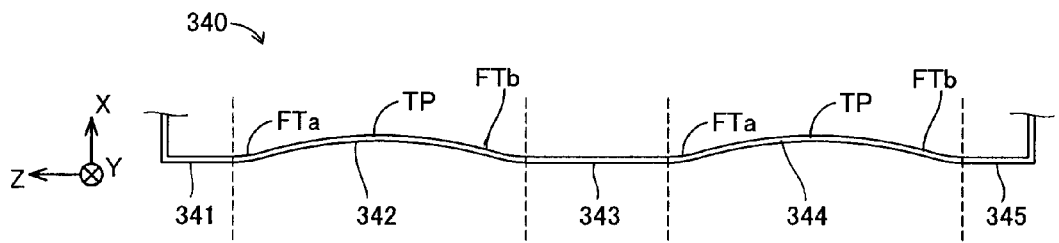
FIGS. 4A and 4B are diagrams for explaining the shape of a second shock absorbing plate 340 according to the first embodiment.
Figure 4B:
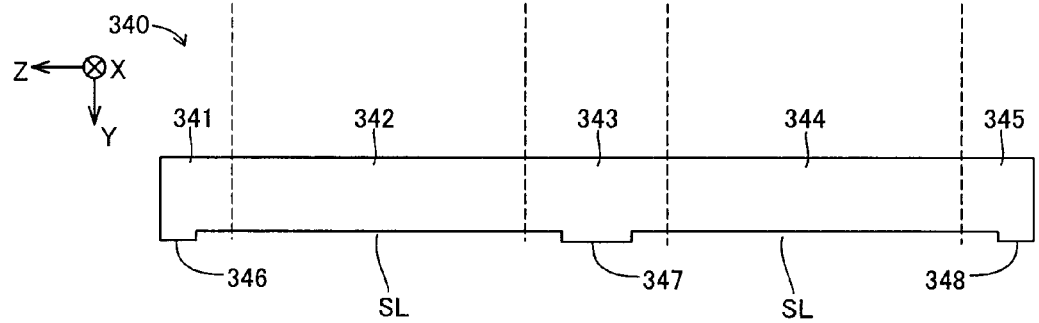
Figure 5A:
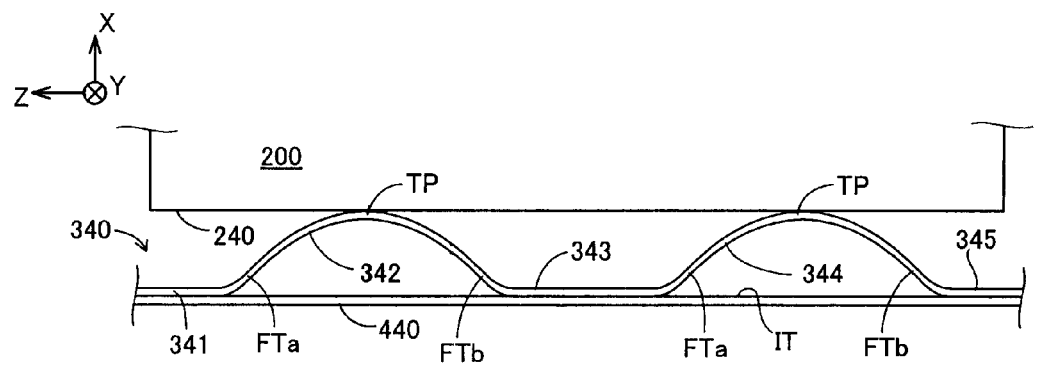
FIGS. 5A and 5B are diagrams for explaining a function of the second shock absorbing plate 340 according to the first embodiment.
Figure 5B:
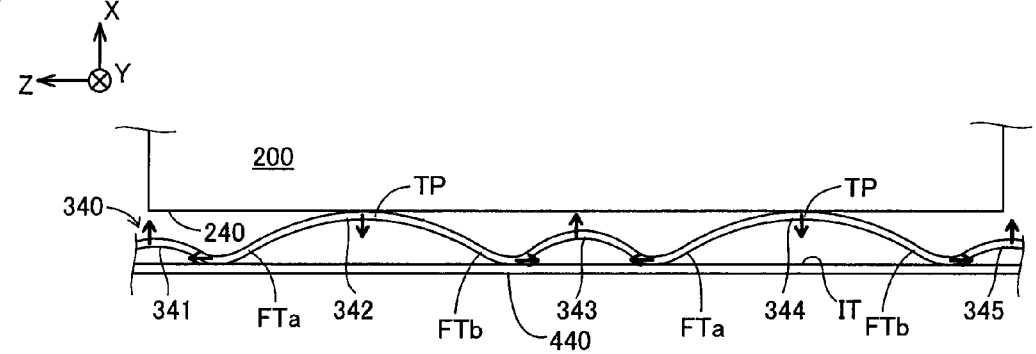

FIGS. 4A and 4B are diagrams for explaining the shape of the second shock absorbing plate 340 according to the first embodiment. FIG. 4A is a diagram illustrating the second shock absorbing plate 340 when viewed from the negative direction of the y-axis. As shown in FIG. 1, the y-axis extends in the direction perpendicular to the cover wall 310. FIG. 4B is a diagram illustrating the second shock absorbing plate 340 when viewed from the negative direction of the x-axis. The x-axis extends in the direction perpendicular to both the inner wall surface of the first long side wall portion 440 and the first long side surface 240 of the hard disk drive 200 in the contained situation. FIGS. 5A and 5B are diagrams for explaining a function of the second shock absorbing plate 340 according to the first embodiment. As shown in FIG. 4A, FIGS. 5A and 5B are diagrams illustrating the second shock absorbing plate 340 when viewed from the negative direction of the y-axis. In FIGS. 5A and 5B, for easier understanding, the dimension along the x-axis is enlarged relative to the dimension along the z-axis. In FIG. 5A, the second shock absorbing plate 340 is undergoing little deformation (i.e., is in its normal state), with the case 100 containing the hard disk drive 200 standing still. In FIG. 5B, the second shock absorbing plate 340 is undergoing elastic deformation (i.e., is in its shock absorbing state) when the case 100 containing the hard disk drive 200 receives a shock due to, for example, dropping impact.

As shown in FIG. 4B, the second shock absorbing plate 340 has a substantially rectangular shape when viewed in the direction of the x-axis. The second shock absorbing plate 340 includes leg portions 346, 347, and 348 formed at both longitudinal end portions and a longitudinal central portion thereof. As shown in FIG. 1, the second shock absorbing plate 340 is joined to the cover wall 310 at the leg portions 346, 347, and 348. Slits SL are defined between the non-leg portions of the second shock absorbing plate 340 and the cover wall 310. As described above, the second shock absorbing plate 340 is joined to the cover wall 310 at only the leg portions 346, 347, and 348. This contributes to reducing the degree of inhibition of the deformation (which will be described in detail below) of the second shock absorbing plate 340 in the shock absorbing state by joints (if they made) between the second shock absorbing plate 340 and the cover wall 310.

The second shock absorbing plate 340 includes two arched portions 342 and 344 and three flat portions 341, 343, and 345. Similarly to the arched portion 332 of the above-described first shock absorbing plate 330, the arched portions 342 and 344 have a circular arc when projected in the positive direction of the x-axis. Each of the arched portions 342 and 344, having a shape of a circular arc, includes a top portion TP and foot portions FTa and FTb. In the contained situation, the top portion TP is in contact with the first long side surface 240 of the hard disk drive 200, while the foot portions FTa and FTb contact the inner wall surface (i.e., surface IT in FIGS. 5A and 5B) of the first long side wall 440 of the box member 400.

In FIGS. 4A, 5A, and 5B, the flat portion 341 is continuous with the foot portion FTa of the arched portion 342 and extends from the foot portion FTa in the direction away from the top portion TP of the arched portion 342 (i.e., in the positive direction of the z-axis in FIG. 4A). The end of the flat portion 341 opposite to the foot portion FTa is fixed and prevented from shifting along either the z-axis or the x-axis, as this end is in contact with the first short side wall 430 of the box member 400 (see FIG. 1), and is connected with the first shock absorbing plate 330. The flat portion 343 has one end continuous with the foot portion FTb of the arched portion 342, and the opposite end continuous with the foot portion FTa of the arched portion 344. The flat portion 345 is continuous with the foot portion FTb of the arched portion 344 and extends from the foot portion FTb in the direction away from the top portion TP of the arched portion 344 (i.e., in the negative direction of the z-axis in FIGS. 4A and 4B). The end of the flat portion 345 opposite to the foot portion FTb is fixed and prevented from shifting along either the z-axis or the x-axis, as this end is in contact with the second short side wall 420 of the box member 400 (see FIG. 1), and is connected with the accessory plate 320.

The flat portion 341 and the foot portion FTa of the arched portion 342 are smoothly continuous with each other. Similarly, the flat portion 343 and the foot portion FTb of the arched portion 342 are smoothly continuous with each other, and the flat portion 343 and the foot portion FTa of the arched portion 344 are smoothly continuous with each other. Moreover, the flat portion 345 is smoothly continuous with the foot portion FTb of the arched portion 344.

As shown in FIG. 5B, when the shock is absorbed, the top portion TP of each of the arched portions 342 and 344 is pressed by the first long side surface 240 of the hard disk drive 200, while at the same time the foot portions FTa and FTb of each of the arched portions 342 and 344 are pressed by the inner wall surface of the first long side wall portion 440. As a result, each of the arched portions 342 and 344 is compressed to be elastically deformed in the direction perpendicular to both the first long side surface 240 of the hard disk drive 200 and the inner wall surface of the first long side wall 440 (i.e., in the direction parallel to the x-axis).

Moreover, as shown in FIG. 5B, in accordance with a mechanism similar to the mechanism described above with respect to the first shock absorbing plate 330, when the shock is absorbed, each of the flat portions 341, 343, and 345 of the second shock absorbing plate 340 is elastically bent so as to approach the first long side surface 240 of the hard disk drive 200 in response to the deformation of the arched portions 342 and 344.

The shape and function of the third shock absorbing plate 350 are identical to those of the above-described second shock absorbing plate 340, and the description thereof is therefore omitted.

The case 100 described above can achieve an improvement in shock resistance while limiting an increase in size of the case 100, because of provision of the first, second, and third shock absorbing plates 330, 340, and 350. To describe specifically with reference to the first shock absorbing plate 330 (see FIGS. 3A and 3B) by way of illustration, when the shock is absorbed, the arched portion 332 of the first shock absorbing plate 330 is elastically deformed as a result of being pressed by the first short side surface 230 of the hard disk drive 200 and the inner wall surface of the first short side wall portion 430 of the case 100 as described above. Each of the flat portions 331 and 333 is then elastically bent in response to the deformation of the arched portion 332. As a result, the energy of the shock applied to the case 100 is converted to energy that is used to deform all of the arched portion 332 and the flat portions 331 and 333 of the first shock absorbing plate 330. That is, the shock is efficiently absorbed by the elastic deformation of the substantially entire part of the first shock absorbing plate 330 which is situated between the first short side surface 230 of the hard disk drive 200 and the inner wall surface of the first short side wall 430. The improvement in the shock resistance of the case 100 is thus achieved while limiting the increase in the size of the case 100 by avoiding an excessive increase in space between the first short side surface 230 of the hard disk drive 200 and the inner wall surface of the first short side wall portion 430.

Furthermore, in the case 100 described above, each of the arched portions 332, 342, and 344 of the shock absorbing plates 330, 340, and 350 is in the form of a circular arc when viewed in the direction of the y-axis. This geometry can prevent the arched portions 332, 342, and 344 from undergoing local buckling when the shock is absorbed. Compared with uniform deformation, the local buckling is more likely to result in plastic deformations, which may lead to deterioration in the shock absorbing capability of the case 100. According to the present embodiment, each of the arched portions 332, 342, and 344 is so shaped that applied stress will be distributed substantially evenly over the arched portion 332, 342, or 344 as in the case of an arch bridge. As a result, when deformed, each of the arched portions 332, 342, and 344 can efficiently transfer force acting to bend the flat portion 331, 333, 341, 343, or 345 to the flat portion 331, 333, 341, 343, or 345 through the foot portion FTa or FTb.

Furthermore, in the case 100 described above, each foot portion of each arched portion of each of the shock absorbing plates 330, 340, and 350 is smoothly continuous with an adjacent one of the flat portions (for instance, in FIG. 2A, the foot portion FTa of the arched portion 332 is smoothly continuous with the flat plate portion 331). This contributes to preventing stress from concentrating on the point at which the foot portion of the arched portion and the flat portion meet each other, when the shock is absorbed. This in turn contributes to preventing the meeting point from undergoing local buckling. This makes it more certain that each of the shock absorbing plates 330, 340, and 350 will be deformed over its entire length to absorb the shock.

Furthermore, each of the second and third shock absorbing plates 340 and 350 of the case 100 described above includes two arched portions (specifically, the arched portions 342 and 344 of the second shock absorbing plate 340 (see FIG. 4A), for instance). In addition, a flat portion is formed between the two arched portions (specifically, the flat portion 343 is formed between the arched portions 342 and 344 (see FIG. 4A), for instance). As a result, when the shock is absorbed, the arched portions are deformed, so that the shock can be distributed widely. Moreover, as a result of the deformations of the arched portions, the flat portion between them receives bending forces through both ends thereof from the arched portions to undergo a great deformation. Each of the second and third shock absorbing plates 340 and 350 can therefore absorb a greater shock.

Furthermore, in the case 100 described above, the foot portion FTa (i.e., foot portion on one side) of each of the arched portions of the shock absorbing plates 330, 340, and 350 is continuous with an adjacent one of the flat portions (specifically, in FIG. 2A, the foot portion FTa of the arched portion 332 is continuous with the flat portion 331, for instance), while the foot portion FTb (i.e., foot portion on the opposite side) of the arched portion is continuous with an adjacent one of the flat portions (specifically, the foot portion FTb of the arched portion 332 is continuous with the flat portion 333, for instance). Accordingly, two of the flat portions are bent in response to the deformation of each one of the arched portions. This contributes to absorbing a greater shock.

Furthermore, in the case 100 described above, each of the shock absorbing plates 330, 340, and 350 is formed as an integral part of the cover member 300. This contributes to the reduction in the number of parts and to easier assemblage.

Furthermore, as described above, the encircling structure formed by the three shock absorbing plates 330, 340, and 350 and the accessory plate 320 of the cover member 300 is designed to have dimensions slightly smaller than those of the outer boundaries of the hard disk drive 200. Accordingly, the housing of the hard disk drive 200 is fitted inside the encircling structure while the encircling structure is bent outward. Therefore, even if a production error occurs regarding the dimensions of the outer boundaries of the hard disk drive 200, it is possible to contain the hard disk drive 200 inside the case 100 so that the hard disk drive 200 can be prevented from wobbling.

Furthermore, after the hard disk drive 200 has been fitted inside the encircling structure of the cover member 300 made of the thermoplastic resin, the cover member 300 is fitted into the box member 400 to assemble the case 100. Therefore, an unwanted deformation is more unlikely to occur in the above described assembling process than, for example, in the case where the hard disk drive 200 is disposed inside the case after a shock absorber (made of gel-like polystyrene, for example) that tends to undergo an elastic deformation more easily (i.e., has a smaller modulus of elasticity) than the thermoplastic resin, is attached to the outer wall surface of the housing of the hard disk drive 200. Thus, a reduction in the probability of an unsuccessful assemblage of the case 100 is achieved.

As will be understood from the foregoing description, the arched portion 332 according to the first embodiment corresponds to a first curved portion as recited in the appended claims. In addition, the flat portion 331 according to the first embodiment corresponds to a first flexible portion or a first extending portion as recited in the appended claims, while the flat portion 333 according to the first embodiment corresponds to a second flexible portion or a second extending portion as recited in the appended claims. Moreover, the arched portion 342 according to the first embodiment corresponds to the first curved portion as recited in the appended claims, while the arched portion 344 according to the first embodiment corresponds to the second curved portion as recited in the appended claims. Furthermore, the flat portion 343 according to the first embodiment corresponds to the first flexible portion or the first extending portion as recited in the appended claims.

B. Second Embodiment

Figure 6A:
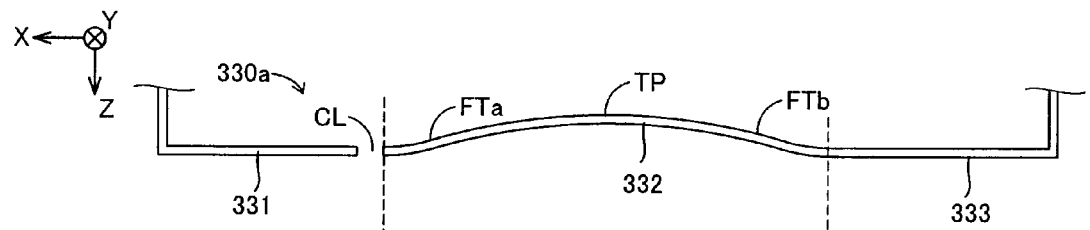
FIGS. 6A and 6B are diagrams for explaining the shape of a first shock absorbing plate 330a according to a second embodiment.
Figure 6B:
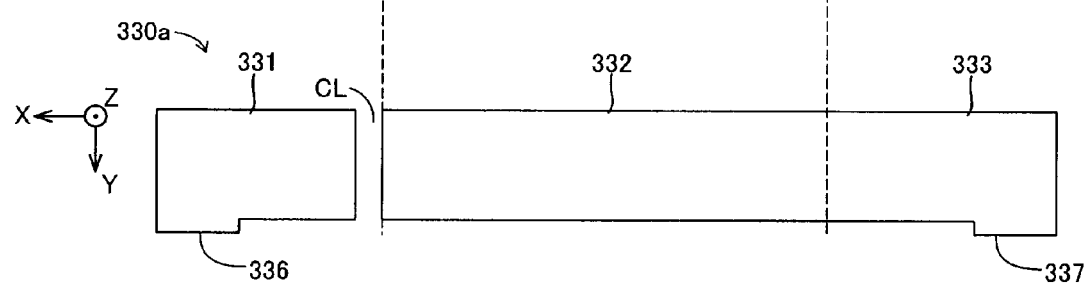
Figure 7A:
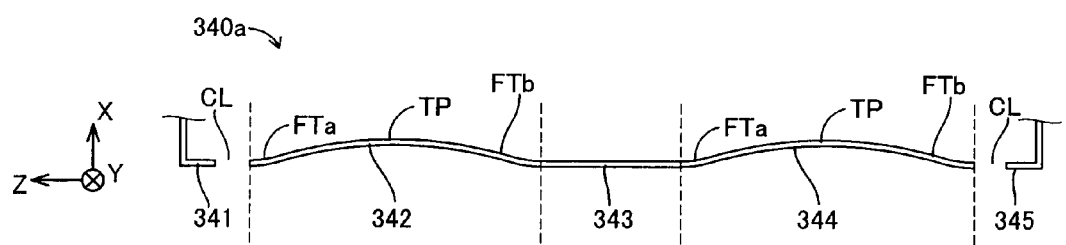
FIGS. 7A and 7B are diagrams for explaining the shape of a second shock absorbing plate 340a according to the second embodiment.
Figure 7B:
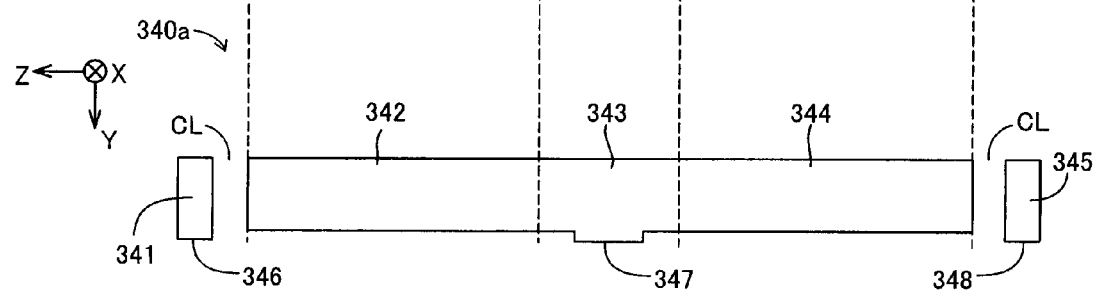

FIGS. 6A and 6B are diagrams for explaining the shape of a first shock absorbing plate 330a according to a second embodiment. FIGS. 7A and 7B are diagrams for explaining the shape of a second shock absorbing plate 340a according to the second embodiment. The second embodiment is different from the first embodiment in the shapes of the shock absorbing plates. The second embodiment is otherwise identical in structure to the first embodiment, and redundant descriptions will therefore be omitted.

As shown in FIGS. 6A and 6B, the first shock absorbing plate 330a according to the second embodiment is different from the first shock absorbing plate 330 (see FIGS. 2A and 2B) according to the first embodiment in that the foot portion FTa of an arched portion 332 is not continuous with a flat portion 331. That is, in the first shock absorbing plate 330a according to the second embodiment, there is a gap CL between the foot portion FTa of the arched portion 332 and the flat portion 331. In other words, in the first shock absorbing plate 330a according to the second embodiment, the end of the foot portion FTa of the arched portion 332 away from a top portion TP of the arched portion 332 forms a free end. The first shock absorbing plate 330a according to the second embodiment is otherwise similar in structure to the first shock absorbing plate 330 according to the first embodiment.

As shown in FIGS. 7A and 7B, the second shock absorbing plate 340a according to the second embodiment is different from the second shock absorbing plate 340 (see FIGS. 4A and 4B) according to the first embodiment in that the foot portion FTa of an arched portion 342 is not continuous with a flat plate portion 341, and that the foot portion FTb of an arched portion 344 is not continuous with a flat plate portion 345. That is, in the second shock absorbing plate 340a according to the second embodiment, there is a gap CL between the foot portion FTa of the arched portion 342 and the flat portion 341, and there is also a gap CL between the foot portion FTb of the arched portion 344 and the flat portion 345. In other words, in the second shock absorbing plate 340a according to the second embodiment, the end of the foot portion FTa of the arched portion 342 away from a top portion TP of the arched portion 342 forms a free end, while at the same time the end of the foot portion FTb of the arched portion 344 away from a top portion TP of the arched portion 344 forms a free end. The second shock absorbing plate 340a according to the second embodiment is otherwise similar in structure to the second shock absorbing plate 340 according to the first embodiment.

The structure of a third shock absorbing plate according to the second embodiment is identical to that of the second shock absorbing plate 340a illustrated in FIGS. 7A and 7B, and the description thereof is therefore omitted.

In a case according to the second embodiment described above, a foot portion on one side of each of the arched portions of the shock absorbing plates is continuous with the adjacent flat portion as in the first embodiment, while the other foot portion of the arched portion, which is located opposite to the aforementioned foot portion, ends in a free end unlike in the first embodiment. This structure allows the arched portion to undergo a greater deformation upon application of a small force as compared with the case where neither of the foot portions of the arched portion ends in a free end (as in the first embodiment). Therefore, each of the shock absorbing plates according to the second embodiment can absorb a relatively small shock more effectively than that according to the first embodiment where neither of the foot portions ends in a free end.

Figure 8:
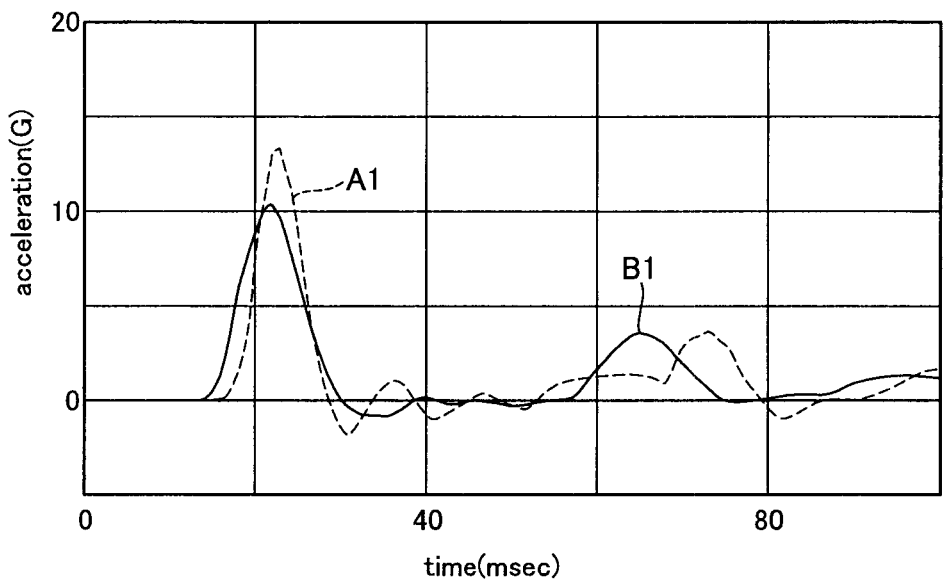
FIGS. 8 and 9 are graphs illustrating shock absorbing capability of the case according to the first embodiment and shock absorbing capability of a case according to the second embodiment for the sake of comparison.
Figure 9:
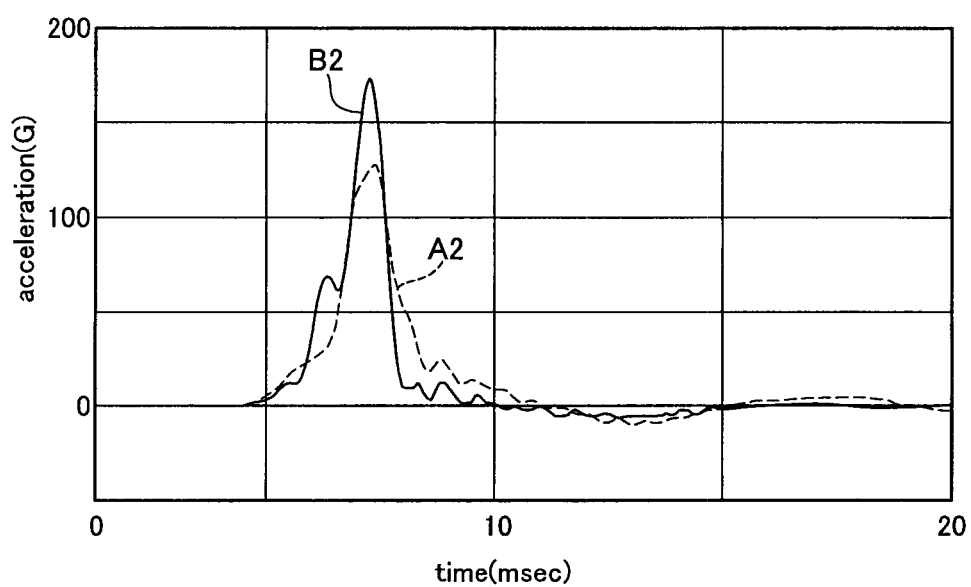

FIGS. 8 and 9 are graphs illustrating the shock absorbing capability of the case 100 according to the first embodiment and the shock absorbing capability of the case according to the second embodiment for the sake of comparison. FIG. 8 illustrates the variation over time of the acceleration that is applied to the hard disk drive 200 disposed inside the case, due to an impact between the case and a hard floor when the case containing the hard disk drive 200 has been dropped onto the hard floor from a height of 1 centimeter (cm). FIG. 9 illustrates the variation over time of the acceleration that is applied to the hard disk drive 200 disposed inside the case, due to an impact between the case and the hard floor when the case containing the hard disk drive 200 has been dropped onto the hard floor from a height of 10 cm. Smaller peak values of acceleration indicate smaller shocks transmitted to the hard disk drive 200, and shorter duration of acceleration indicates a smaller shock transmitted to the hard disk drive 200. In FIGS. 8 and 9, broken curves A1 and A2 represent the variation over time of the acceleration for the case 100 according to the first embodiment, while solid curves B1 and B2 represent the variation over time of the acceleration for the case according to the second embodiment.

FIG. 8 shows that, in the case of the fall from a height of 1 cm, the shock transmitted to the hard disk drive 200 disposed inside the case according to the second embodiment is smaller than the shock transmitted to the hard disk drive 200 disposed inside the case 100 according to the first embodiment. In contrast, FIG. 9 shows that, in the case of the fall from a height of 10 cm, the shock transmitted to the hard disk drive 200 disposed inside the case according to the second embodiment is greater than the shock transmitted to the hard disk drive 200 disposed inside the case 100 according to the first embodiment.

It is seen from the graphs of FIGS. 8 and 9 that the case 100 according to the second embodiment can absorb a relatively small shock more effectively than the case 100 according to the first embodiment. In contrast, it is also seen that the case 100 according to the first embodiment can absorb a relatively large shock more effectively than the case 100 according to the second embodiment.

C. Third Embodiment

Figure 10:
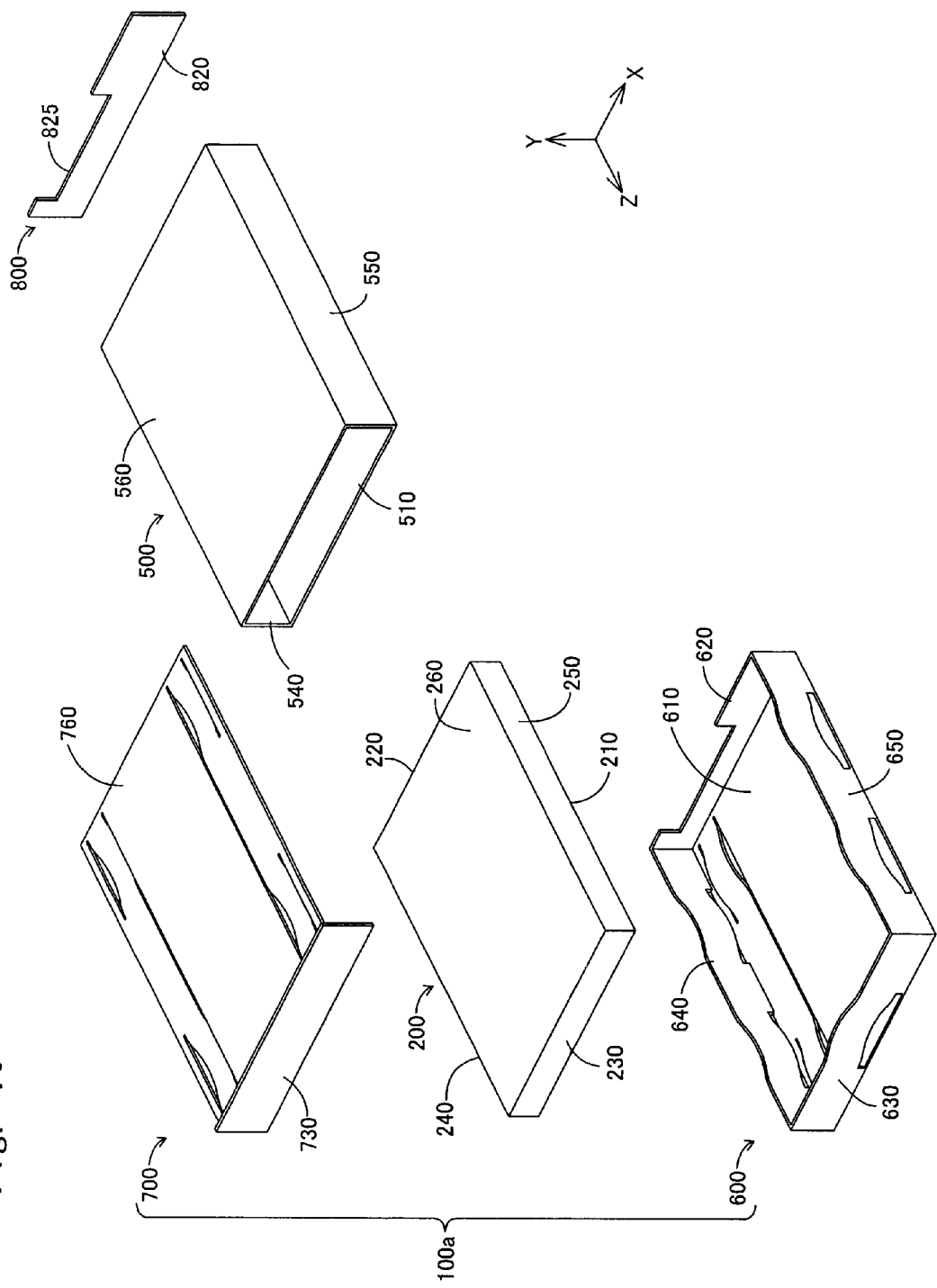
FIG. 10 is a schematic diagram illustrating the structure of a case according to a third embodiment.

FIG. 10 is a schematic diagram illustrating the structure of a case 100a according to a third embodiment. The case 100a includes a hexahedral wall member 500, a first shock absorbing member 600, a second shock absorbing member 700, and a rear cover 800. Just like the case 100 according to the first embodiment, each of the first and second shock absorbing members 600 and 700 is made of ABS resin, which is a thermoplastic resin, and is produced by an injection molding process. Each of the hexahedral wall member 500 and the rear cover 800 is made of metal, such as aluminum or Duralumin, for example. Note, however, that each of the hexahedral wall member 500 and the rear cover 800 need not necessarily be made of metal, but may be made of resin such as ABS resin.

The hexahedral wall member 500 includes a bottom wall 510, a first long side wall 540, a second long side wall 550, and a top wall 560. In the contained situation, each of these walls 510, 540, 550, and 560 lie parallel to the corresponding faces of the outer hexahedral surface of the hard disk drive 200 and the first and second shock absorbing members 600 and 700 intervene between the hexahedral wall member 500 and the hard disk drive 200. Specifically, the bottom wall 510 has an inner wall surface that extends parallel to the first wide surface 210 (i.e., surface perpendicular to the y-axis in FIG. 10) of the hard disk drive 200 in the contained situation. The first long side wall 540 has an inner wall surface that extends parallel to the first long side surface 240 (i.e., surface perpendicular to the x-axis in FIG. 10) of the hard disk drive 200 in the contained situation. The second long side wall 550 has an inner wall surface that extends parallel to the second long side surface 250 (i.e., surface perpendicular to the x-axis in FIG. 10) of the hard disk drive 200 in the contained situation. The top wall 560 has an inner wall surface that extends parallel to the second wide surface 260 (i.e., surface perpendicular to the y-axis in FIG. 10) of the hard disk drive 200 in the contained situation.

The first shock absorbing member 600 includes a first shock absorbing plate 630, a second shock absorbing plate 640, a third shock absorbing plate 650, a fifth shock absorbing plate 610, and an accessory plate 620. The fifth shock absorbing plate 610 extends parallel to the first wide surface 210 of the hard disk drive 200 in the contained situation.

The second shock absorbing member 700 includes a sixth shock absorbing plate 760 and a front wall 730. The front wall 730 has an inner wall surface that extends parallel to the first short side surface 230 (i.e., surface perpendicular to the z-axis in FIG. 10) of the hard disk drive 200 in the contained situation. The sixth shock absorbing plate 760 extends parallel to the second wide surface 260 of the hard disk drive 200 in the contained situation. The rear cover 800 includes a rear wall 820 having a connector opening 825 therein.

When the hard disk drive 200 is disposed inside the case 100a, the housing of the hard disk drive 200 is fitted inside the encircling structure formed by the three shock absorbing plates 630, 640, and 650 and the accessory plate 620 of the first shock absorbing member 600. Then, the second shock absorbing member 700 is disposed opposite to the first shock absorbing member 600 with the hard disk drive 200 fitted therein. The sixth shock absorbing plate 760 is so disposed as to cover the second wide surface 260 of the hard disk drive 200, and the front wall 730 is so disposed as to cover the outer surface of the first shock absorbing plate 630 which is perpendicular to the z-axis. Then, the hard disk drive 200 and the first and second shock absorbing members 600 and 700 so disposed as described above are inserted into the hexahedral wall member 500 through an opening on one lengthwise side of the hexahedral wall member 500. Then, the opening on the other lengthwise side of the hexahedral wall member 500 is covered with the rear cover 800. This situation results in the contained situation described above.

In the contained situation, the first shock absorbing plate 630 is between the first short side surface 230 of the hard disk drive 200 and the inner wall surface of the front wall portion 730; the second shock absorbing plate 640 is between the first long side surface 240 of the hard disk drive 200 and the inner wall surface of the first long side wall 540; the third shock absorbing plate 650 is between the second long side surface 250 of the hard disk drive 200 and the inner wall surface of the second long side wall 550; the fifth shock absorbing plate 610 is between the first wide surface 210 of the hard disk drive 200 and the inner wall surface of the bottom wall 510; and the sixth shock absorbing plate 760 is between the second wide surface 260 of the hard disk drive 200 and the inner wall surface of the top wall 560.

The shapes and functions of the three shock absorbing plates 630, 640, and 650 and the accessory plate 620 of the case 100a are identical to those of the three shock absorbing plates 330, 340, and 350 and the accessory plate 320, respectively, of the case 100 according to the first embodiment, and redundant descriptions will therefore be omitted.

Figure 11A:
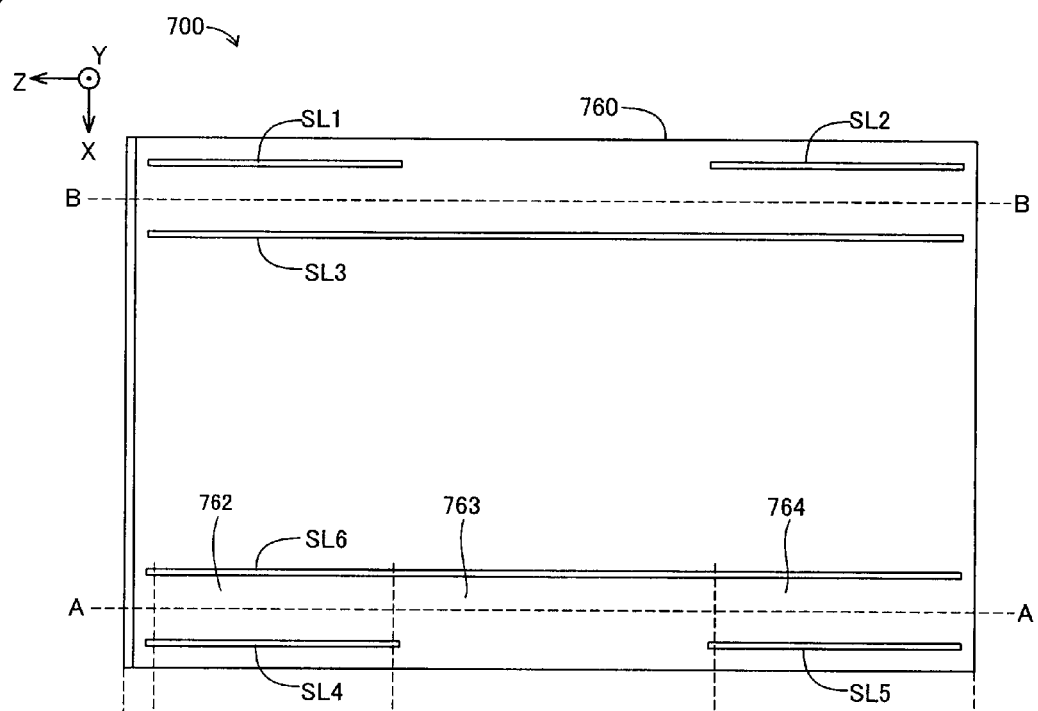
FIGS. 11A and 11B are diagrams for explaining the shape of a sixth shock absorbing plate 760 according to the third embodiment.
Figure 11B:
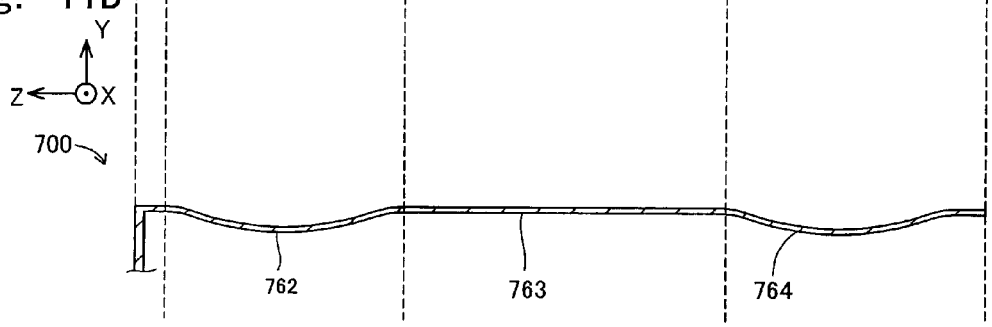

FIGS. 11A and 11B are diagrams for explaining the shape of the sixth shock absorbing plate 760 according to the third embodiment. FIG. 11A is a diagram illustrating the sixth shock absorbing plate 760 when viewed in the positive direction of the y-axis. The y-axis extends in the direction perpendicular to both the inner wall surface of the top wall 560 and the second wide surface 260 of the hard disk drive 200, in the contained situation. FIG. 11B shows the cross section of the second shock absorbing member 700 taken along line B-B of FIG. 11A. Note that the cross section of the second shock absorbing member 700 taken along line A-A of FIG. 11A is identical in shape to that of the second shock absorbing member 700 taken along line B-B of FIG. 11A.

The sixth shock absorbing plate 760 has slits SL1, SL2, SL3 made therein. A shock absorbing structure is formed as a portion of the sixth shock absorbing plate 760 surrounded by the slits SL1 to SL3. More specifically, as shown in FIG. 11B, an arched portion 762 is formed between the slits SL1 and slit SL3. The arched portion 762 has a cross section similar in shape to that of the arched portion 332 according to the first embodiment. Similarly, as shown in FIG. 11B, an arched portion 764 is formed between the slits SL2 and SL3. The arched portion 764 has a shape similar to that of the arched portion 762. In FIG. 11B, a flat portion 763 lies between the two arched portions 762 and 764. Note that a shock absorbing structure similar to that formed as the portion surrounded by the slits SL1 to SL3 is also formed as a portion of the sixth shock absorbing plate 760 surrounded by the slits SL4 to SL6. The sixth shock absorbing plate 760 can therefore absorb shocks given to the case e with a mechanism similar to that of the first shock absorbing plate 330 (see FIGS. 2A and 2B) of the first embodiment.

The shape and function of the fifth shock absorbing plate 610 are identical to those of the sixth shock absorbing plate 760 described above, and the description thereof is therefore omitted.

The case 100a according to the third embodiment described above includes the three shock absorbing plates 630, 640, and 650 which have structures similar to those of the shock absorbing plates 330, 340, and 350, respectively, of the case 100 according to the first embodiment. Therefore, the case 100a can achieve an improvement in shock resistance while limiting an increase in its size, as with the case 100 according to the first embodiment.

Moreover, the case 100a includes the fifth shock absorbing plate 610 which extends parallel to the first wide surface 210 of the hard disk drive 200, and the sixth shock absorbing plate 760 which extends parallel to the second wide surface 260. Therefore, compared with the case 100 according to the first embodiment, the case 100a can achieve an improvement in resistance against shocks applied in many directions.

Furthermore, in the case 100a, the first and second shock absorbing members 600 and 700, which are to be deformed to absorb a shock, and the hexahedral wall member 500, which need not be deformed to absorb the shock, are formed by separate members. Therefore, the wall member and the shock absorbing members may be made of different materials. This leads to the possibility of choosing a greater number of materials for those members.

D. Variations

The present disclosure is not limited to the above-described embodiments. It is to be understood by those skilled in the art that variations and modifications can be made without departing from the scope and spirit of the present disclosure. Some variations of the above-described embodiments will now be described below.

(1) Each of the arched portions (for example, the arched portion 332 of the first shock absorbing plate 330 (see FIGS. 2A and 2B), and the arched portions 342 and 344 of the second shock absorbing plate 340 (see FIGS. 4A and 4B)) according to the above-described embodiments has the shape of a circular arc in a cross-section as viewed in a particular direction (for example, in a cross-section as viewed in a direction along the y-axis in the case of the arched portions 332, 342, and 344). Note, however, that the shape of this cross-section is not limited to a circular arc. For example, the shape of the cross-section may be of a partial ellipse or a partial sinusoid. In general, the shape of the cross-section has only to be formed like a curve having a top portion and foot portions.

(2) Each of the flat portions (for example, the flat portions 331 and 333 of the first shock absorbing plate 330 (see FIGS. 2A and 2B), the flat portions 341, 343, and 345 of the second shock absorbing plate 340 (see FIGS. 4A and 4B)) according to the above-described embodiments is plane and looks like a straight line in a cross-section as viewed in the particular direction (for example, in a cross-section as viewed in the direction of the y-axis in the case of the flat portions 331, 333, 341, 343, and 345). Note, however, that the shape of this cross-section is not limited to a straight line. Specifically, the shape of the cross-section may be like a curve (for example, a circular arc) having a small curvature in the non-deformed state before a shock is absorbed. In this case, the shape of the cross-section will be changed into a curve having a greater curvature as a result of bending when the shock is absorbed.

(3) The case according to each of the above-described embodiments is to contain the 2.5-inch hard disk drive 200. Note, however, that this is not essential. Cases according to other embodiments may contain hard disk drives of other sizes, such as 3.5-inch hard disk drives, for example. Moreover, cases according to other embodiments may contain other types of disk storage apparatuses, such as CD-ROM drives, DVD-ROM drives, Blu-ray disc drives, etc.

(4) In each of the above-described embodiments, each foot portion of each arched portion is smoothly continuous with the adjacent one of the flat portions. Note, however, that the foot portion may not necessarily be smoothly continuous with the adjacent flat portion.

(5) A known shock absorber, e.g., polystyrene gel, may be placed in the space where there is no shock absorbing plate, in a modification of each of the above-described embodiments. For example, in a modification of the case 100 (see FIG. 1) according to the first embodiment, a known shock absorber may be placed between the bottom wall 460 of the case 100 and the second wide surface 260 of the hard disk drive 200. A shock absorbing plate including an arched portion and a flat portion, such as the arched portion 332 and the flat portion 331 of the first shock absorbing plate 330, may be situated between at least a face of the outer wall surface of the hard disk drive 200 and that face of the inner wall surface of a case which extends parallel to the face of the outer wall surface. Either a known shock absorber or no shock absorber may be situated between the remaining faces of the outer wall surface of the hard disk drive 200 and those faces of the inner wall surface of the case which are opposite and parallel to the remaining faces of the outer wall surface of the hard disk drive 200.

(6) Regarding the above-described embodiments, in the contained situation, each arched portion of each shock absorbing plate is so oriented that each foot portion is closer to the inner wall surface of the case while the top portion is closer to the outer wall surface of the storage apparatus. Note, however, that, in other embodiments, each arched portion of any shock absorbing plate may instead be so oriented in the contained situation that the top portion is closer to the inner wall surface of the case while each foot portion is closer to the outer wall surface of the storage apparatus. Specifically, the arched portion 332 of the first shock absorbing plate 330 shown in FIG. 3A or 3B may be so oriented that the top portion TP is closer to the inner wall surface of the first short side wall portion 430 while the foot portions FTa and FTb are closer to the first short side surface 230 of the hard disk drive 200. In this case, each of the flat portions 331 and 333 extends along the first short side surface 230 of the hard disk drive 200.

While the case has been shown and described by way of embodiments and variations, the embodiments described herein are merely intended to facilitate understanding, and imply no limitation to the invention. Various modifications and improvements are possible without departing from the spirit and scope of the invention as recited in the appended claims.

What is claimed is:

1. A case arranged to contain a disk storage apparatus having a hexahedral shape including a outer flat face, the case comprising:
    a case wall including a case inner flat face that extends along the outer flat face of the disk storage apparatus when the disk storage apparatus is contained in the case; and
    a deformable plate disposed between the outer flat face and the case inner flat face and that extends along the case inner flat face when the disk storage apparatus is contained in the case,
    wherein the deformable plate includes:
        a first arched plate portion having a arched shape in a cross-section as viewed in a direction parallel to the case inner flat face, the first arched plate portion including a first top portion, a first foot portion and a second foot portion, the first top portion disposed closer to a first flat face that is one of the outer flat face and the case inner flat face than a second flat face that is the other of the outer flat face and the case inner flat face, the first foot portion and the second foot portion disposed closer to the second flat face than the first flat face, the first arched plate portion configured to be deformed under a pressure applied perpendicularly to the first top portion; and
        a first flexible plate portion that is continuous with the first foot portion and extends from the first foot portion in a direction away from the first top portion, the first flexible plate portion configured to bend in response to deformation of the first arched plate portion.

2. The case according to claim 1, wherein
the arched shape of the first arched plate portion is a circular arc shape.

3. The case according to claim 1, wherein
the deformable plate includes a joining portion including an joining portion outer surface and a joining portion inner surface, the joining portion being a portion where the first foot portion and the first flexible plate portion join together,
the joining portion outer surface faces the case inner flat face,
the joining portion inner surface faces the outer flat face, and
the joining portion outer surface and the joining portion inner surface form smooth curved surfaces.

4. A case arranged to contain a disk storage apparatus having a hexahedral shape including a outer flat face, the case comprising:
a case wall including a case inner flat face that extends along the outer flat face of the disk storage apparatus when the disk storage apparatus is contained in the case; and
a deformable plate disposed between the outer flat face and the case inner flat face and that extends along the case inner flat face when the disk storage apparatus is contained in the case,
wherein the deformable plate includes:
a first arched plate portion having a arched shape in a cross-section as viewed in a specific direction parallel to the case inner flat face, the first arched plate portion including a first top portion, a first foot portion and a second foot portion, the first top portion disposed closer to a first flat face that is one of the outer flat face and the case inner flat face than a second flat face that is the other of the outer flat face and the case inner flat face, the first foot portion and the second foot portion disposed closer to the second flat face than the first flat face, the first arched plate portion configured to be deformed under a pressure applied perpendicularly to the first top portion;
a second arched plate portion having a arched shape in a cross-section as viewed in the specific direction, the second arched plate portion including a second top portion, a third foot portion and a forth foot portion, the second top portion disposed closer to the first flat face than the second flat face, the third foot portion and the forth foot portion disposed closer to the second flat face than the first flat face, the second arched plate portion configured to be deformed under a pressure applied perpendicularly to the second top portion;
a first flexible plate portion having a first end and a second end, the first end being continuous with the first foot portion of the first arched plate portion, the second end being continuous with the third foot portion of the second arched plate portion, the first flexible plate portion extending from the first foot portion to the third foot portion along the second flat face, the first flexible plate portion configured to bend in response to deformation of the first arched plate portion and the second arched plate portion.

5. The case according to claim 1 or claim 4, wherein
the deformable plate further includes a second flexible plate portion that is continuous with the second foot portion of the first arched plate portion and extend from the second foot portion in a direction away from the first top portion, the second flexible plate portion configured to bend in response to the deformation of the first convex plate portion.

6. The case according to claim 1 or claim 4, wherein
an end of the second foot portion on a side farther away from the first top portion forms a free end.

7. The case according to claim 1 or claim 4, wherein
the disk storage apparatus includes a housing having a substantially rectangular parallelepiped shape, the housing including six surfaces including a first surface and a second surface intersecting with the first surface,
the case includes:
a cover member including a wall portion that extends along the first surface of the housing when the disk storage apparatus is contained in the case; and
a box member including an opening and five wall portions, the opening disposed at a position corresponding to the first surface of the housing, the five wall portions respectively disposed to extend along five of the six surfaces, excluding the first surface, of the housing when the disk storage apparatus is contained in the case, wherein
the case wall is one of the five wall portions of the box member and is disposed to extend along the second surface of the housing,
the outer flat face of the disk storage apparatus is the second surface of the housing, and
the deformable plate is formed integrally with the wall portion of the cover member.

8. The case according to claim 1 or claim 4, wherein
the disk storage apparatus includes a housing having a substantially rectangular parallelepiped shape including a first surface and four surfaces perpendicular to the first surface, and
the case includes:
a wall member including a plurality of the case walls, each of the plurality of the case walls extending along a corresponding one of the four surfaces of the housing when the disk storage apparatus is contained in the case; and
a shock absorbing member separate from the wall member and including a plurality of the deformable plates, each of the plurality of the deformable plates disposed between a corresponding one of the four surfaces of the housing and a corresponding one of the plurality of the case walls when the disk storage apparatus is contained in the case.

9. The case according to claim 1, wherein the deformable plate is made of a thermoplastic resin.

10. A case arranged to contain a disk storage apparatus having a hexahedral shape including a outer flat face, the case comprising:
a case wall including a case inner flat face that extends along the outer flat face of the disk storage apparatus when the disk storage apparatus is contained in the case; and
a deformable plate disposed between the outer flat face and the case inner flat face and that extends along the case inner flat face when the disk storage apparatus is contained in the case,
wherein the deformable plate includes:
a first arched plate portion having a arched shape in a cross-section as viewed in a direction parallel to the case inner flat face, the first arched plate portion including a first top portion, a first foot portion and a second foot portion, the first top portion disposed closer to a first flat face that is one of the outer flat face and the case inner flat face than a second flat face that is the other of the outer flat face and the case inner flat face, the first foot portion and the second foot portion disposed closer to the second flat face than the first flat face; and a first extending plate portion that is continuous with the first foot portion and extends from the first foot portion in a direction away from the first top portion.

11. The case according to claim 10, wherein
the arched shape of the first arched plate portion is a circular arc shape.

12. The case according to claim 10, wherein
the deformable plate includes a joining portion including an joining portion outer surface and a joining portion inner surface, the joining portion being a portion where the first foot portion and the first flexible plate portion join together,
the joining portion outer surface faces the case inner flat face,
the joining portion inner surface faces the outer flat face, and
the joining portion outer surface and the joining portion inner surface form smooth curved surfaces.

13. A case arranged to contain a disk storage apparatus having a hexahedral shape including a outer flat face, the case comprising:
a case wall including a case inner flat face that extends along the outer flat face of the disk storage apparatus when the disk storage apparatus is contained in the case; and
a deformable plate disposed between the outer flat face and the case inner flat face and that extends along the case inner flat face when the disk storage apparatus is contained in the case,
wherein the deformable plate includes:
a first arched plate portion having a arched shape in a cross-section as viewed in a specific direction parallel to the case inner flat face, the first arched plate portion including a first top portion, a first foot portion and a second foot portion, the first top portion disposed closer to a first flat face that is one of the outer flat face and the case inner flat face than a second flat face that is the other of the outer flat face and the case inner flat face, the first foot portion and the second foot portion disposed closer to the second flat face than the first flat face;
a second arched plate portion having a arched shape in a cross-section as viewed in the specific direction, the second arched plate portion including a second top portion, a third foot portion and a forth foot portion, the second top portion disposed closer to the first flat face than the second flat face, the third foot portion and the forth foot portion disposed closer to the second flat face than the first flat face;
a first flexible plate portion having a first end and a second end, the first end is continuous with the first foot portion of the first arched plate portion, the second end is continuous with the third foot portion of the second arched plate portion, the first flexible plate portion extending from the first foot portion to the third foot portion along the second flat face.

14. The case according to claim 10 or claim 13, wherein
the deformable plate further includes a second extending plate portion that is continuous with the second foot portion and extends from the second foot portion in a direction away from the first top portion to reach a fixed end.

15. The case according to claim 10 or claim 13, wherein
an end of the second foot portion on a side further away from the first top portion forms a free end.

16. The case according to claim 10 or claim 13, wherein
the disk storage apparatus includes a housing in a shape of a substantially rectangular parallelepiped, the housing including six surfaces including a first surface and a second surface intersecting with the first surface,
the case includes:
a cover member including a wall portion extending along the first surface of the housing when the disk storage apparatus is contained in the case; and
a box member including an opening and five wall portions, the opening disposed at a position corresponding to the first surface, the five wall portions respectively extending along five of the six surfaces, excluding the first surface, of the housing when the disk storage apparatus is contained in the case, wherein
the case wall is one of the five wall portions of the box member and extends along the second surface of the housing,
the outer flat face of the disk storage apparatus is the second surface of the housing, and
the deformable plate is formed integrally with the cover member.

17. The case according to claim 10 or claim 13, wherein
the disk storage apparatus includes a housing in a shape of a substantially rectangular parallelepiped shape including a first surface and four surfaces perpendicular to the first surface, and
the case includes:
a wall member including a plurality of the case walls, each of the plurality of the case walls extending along a corresponding one of the four surfaces of the housing when the disk storage apparatus is contained in the case; and
a shock absorbing member separate from the wall member and including a plurality of the deformable plates, each of the plurality of the deformable plates disposed between a corresponding one of the four surfaces of the housing and a corresponding one of the plurality of the case walls when the disk storage apparatus is contained in the case.

18. The case according to claim 10, wherein the deformable plate is made of a thermoplastic resin.

* * * * *